US011893241B1

(12) United States Patent
Lilly et al.

(10) Patent No.: US 11,893,241 B1
(45) Date of Patent: Feb. 6, 2024

(54) VARIABLE HIT LATENCY CACHE

(71) Applicant: Apple Inc., Cupertino, CA (US)

(72) Inventors: Brian P. Lilly, San Francisco, CA (US);
Sandeep Gupta, Santa Clara, CA (US);
Chandan Shantharaj, San Jose, CA (US); Krishna C. Potnuru, San Jose, CA (US); Sahil Kapoor, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/823,695

(22) Filed: Aug. 31, 2022

(51) Int. Cl.
*G06F 3/06* (2006.01)
*G06F 12/0877* (2016.01)

(52) U.S. Cl.
CPC .......... *G06F 3/0611* (2013.01); *G06F 3/0659* (2013.01); *G06F 3/0673* (2013.01); *G06F 12/0877* (2013.01); *G06F 2212/60* (2013.01)

(58) Field of Classification Search
CPC .... G06F 3/0611; G06F 3/0659; G06F 3/0673; G06F 12/0877; G06F 2212/60
See application file for complete search history.

(56) References Cited

U.S. PATENT DOCUMENTS

| | | | |
|---|---|---|---|
| 7,631,149 B2 | 12/2009 | Osanai et al. | |
| 10,157,134 B2 | 12/2018 | Guthrie et al. | |
| 10,503,640 B2 | 12/2019 | Eckert | |
| 2022/0050492 A1* | 2/2022 | Teman | G06F 1/10 |
| 2022/0121577 A1* | 4/2022 | Grassi | G06F 9/3871 |

OTHER PUBLICATIONS

Steven Hsu, Dynamic Addressing Memory Arrays with Physical Locality, 2002 Proceedings of the 35 th Annual IEEE/ACM International Symposium on Microarchitecture (MICRO-35) (Year: 2002).*
Songyuan Li, et al., "Buffer Filter: A Last-level Cache Management Policy for CPU-GPGPU Heterogeneous System," 2015 IEEE 17th International Conference on High Performance Computing and Communications (HPCC), Downloaded Apr. 12, 2022, pp. 266-271.

* cited by examiner

*Primary Examiner* — Jason W Blust
(74) *Attorney, Agent, or Firm* — Kowert, Hood, Munyon, Rankin & Goetzel, P.C.; Erik A. Heter; Dean M. Munyon

(57) ABSTRACT

A variable latency cache memory is disclosed. A cache subsystem includes a pipeline control circuit configured to initiate cache memory accesses for data. The cache subsystem further includes a cache memory circuit having a data array arranged into a plurality of groups, wherein different ones of the plurality of groups have different minimum access latencies due to different distances from the pipeline control circuit. A plurality of latency control circuits configured to ensure a latency is bounded to a maximum value for a given access to the data array, wherein a given latency control circuit is associated with a corresponding group of the plurality of groups. The latency for a given access may thus vary between a minimum access latency for a group closest to the pipeline control circuit to a maximum latency for an access to the group furthest from the pipeline control circuit.

20 Claims, 7 Drawing Sheets

VARIABLE HIT LATENCY CACHE

BACKGROUND

Technical Field

This disclosure is directed to computer systems, and more particularly, to cache memories in computer systems.

Description of the Related Art

Computer systems employ various types of memory in a memory hierarchy. This hierarchy may extend from architected registers in a processor (e.g., to store operands for instructions to be executed), to bulk storage on, e.g., a hard disk drive or solid state drive. Many computer systems include multiple levels of cache memory as well.

Cache memory is a type of memory that is lower in a memory hierarchy than registers, but higher than a system memory, such as a random access memory (RAM). A cache may store information based on principles of locality, including temporal locality (e.g., information recently accessed is likely to be accessed again within a given time) and spatial locality (e.g., information recently accessed is likely to be stored near other information that will be accessed). Information stored in a cache based on these principles may be accessed faster than it would otherwise be if only stored in system RAM or bulk storage. Thus, caches may improve the overall performance of computer systems by reducing access times for at least some information (e.g., data or instructions) that is to be used by the processor.

SUMMARY

A variable latency cache memory is disclosed. In one embodiment, a cache subsystem includes a pipeline control circuit configured to initiate cache memory accesses for data. The cache subsystem further includes a cache memory circuit having a data array arranged into a plurality of groups, wherein different ones of the plurality of groups have different minimum access latencies due to different distances from the pipeline control circuit. Ones of a plurality of latency control circuits are configured to ensure a latency is bounded to a maximum value for a given access to the data array, wherein a given latency control circuit is associated with a corresponding group of the plurality of groups. The latency for a given access may thus vary between a minimum access latency for a group closest to the pipeline control circuit, to a maximum latency for an access to the group furthest from the pipeline control circuit.

In one embodiment, a first latency control circuit associated with a first one of the plurality of groups is configured to receive first data from a first group and second data from a second group that is more distant from the pipeline control circuit than the first group. The first latency control circuit is configured to forward the second data rather than the first data from the first group when both the first and second data are concurrently available, and store the first data for forwarding at a later time.

BRIEF DESCRIPTION OF THE DRAWINGS

The following detailed description makes reference to the accompanying drawings, which are now briefly described.

DETAILED DESCRIPTION OF EMBODIMENTS

Figure 1:
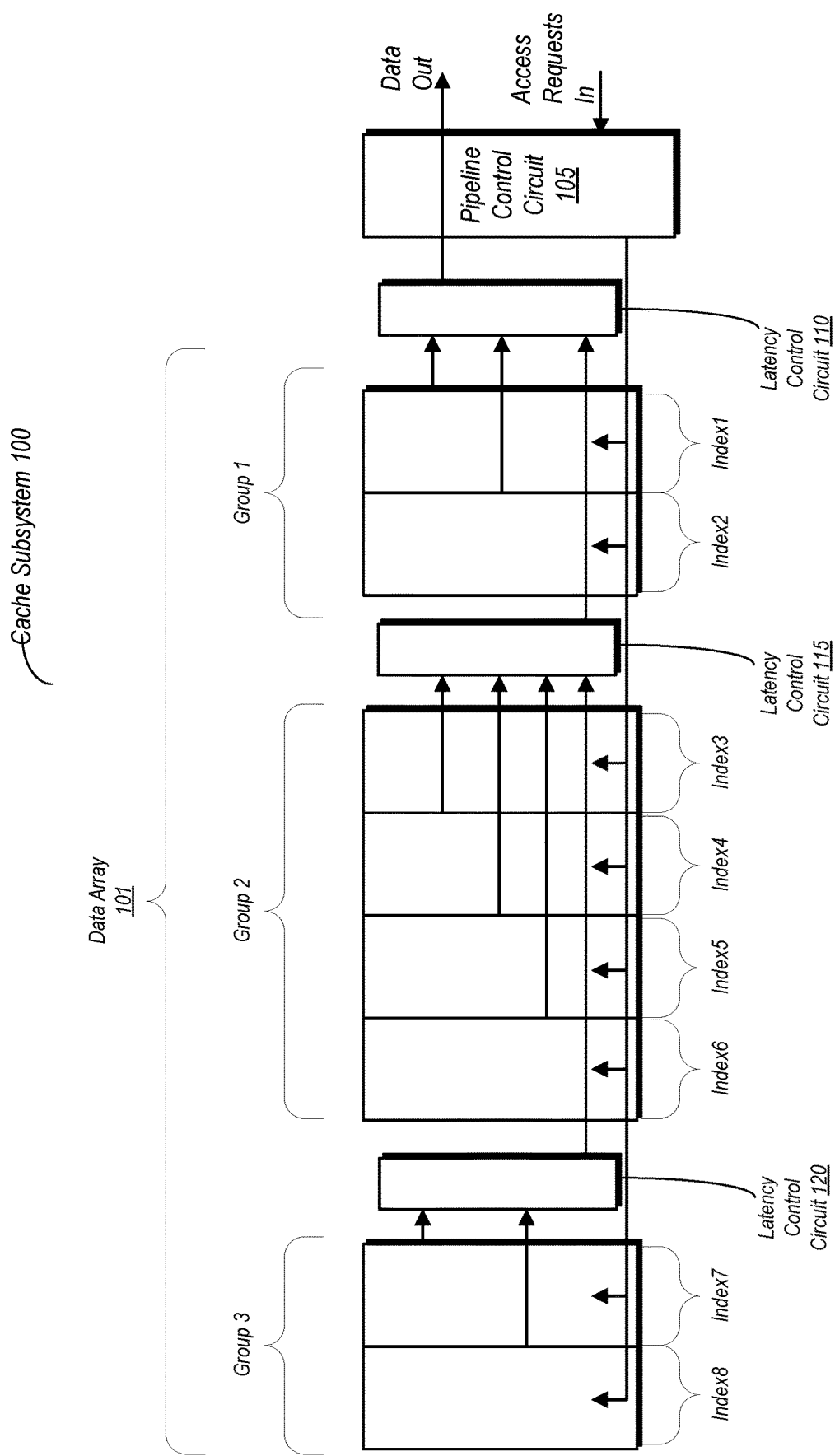
FIG. 1 is a block diagram of one embodiment of a cache subsystem.

The present disclosure is directed to a cache subsystem in which accesses have various latencies depending on the geometry of the cache. Cache memories vary in size, with lower level caches (e.g., a level 3, or L3 cache) being larger than higher level caches (e.g., an L1 data cache). A last level cache is typically a largest cache in a cache hierarchy. Because of area constraints on a chip, the layout geometry of lower level caches may be affected. For example, a cache may be laid out in a geometry such that some locations are significantly farther from control circuitry than other locations. This can affect the timing of cache accesses, with locations closer to the control circuitry being accessed with a significantly lower latency than those at farther locations. The latency issue with regard to large caches can become even more significant as clock frequencies increase.

The present disclosure uses the insight that some cache memories can support a variable access latency. By combining the variable latency with a pipelined approach to cache accesses, the access latency for any given access to a particular cache may be bounded to a maximum value.

Accordingly, the present disclosure implements a cache subsystem in which a pipeline is implemented into a cache floorplan while bounding the maximum latency for any access to the cache. In one embodiment, the locations of a cache memory are divided into groups (e.g., by index) based on their distance from control circuitry of a corresponding cache subsystem. A pipeline is implemented using latency control circuits that are inserted between various ones of the groups. The various ones of the latency control circuits include storage circuits (e.g., flip-flops), while a subset of the latency control circuits also include buffer circuits for storing data from some requests, as well as selection circuits (e.g., multiplexers) used to select data from a particular request to forward on a particular clock cycle. In a given clock cycle, a selection circuit in a particular latency control circuit may select data from a cache access request to a group that is furthest from a pipeline control circuit through which requests are received from an external source. If no request is pending from a group that is upstream (e.g., farther from the pipeline control circuit), the selection circuit of a given latency control circuit may select data either from a buffer circuit or from the associated group directly. If no request is pending upstream or within the present group, no data is forwarded.

Using the arrangement disclosed herein, and scheduling one access per cycle (e.g., clock cycle), the latency of an access to a cache may be limited to a bounded maximum latency, in terms of clock cycles. Data from cache accesses from a group furthest from the pipeline control circuit may be provided at the maximum latency. Data from cache accesses from a group closest to the pipeline control circuit may have a latency that varies between a minimum latency and a maximum latency. For groups in between the furthest and closest groups, access latency may vary between some value greater than the minimum, up to the maximum value. In one embodiment to be discussed herein, the latency of accesses may vary between one clock cycle (the minimum possible latency for a closest group) and four clock cycles (the maximum bounded latency for any access).

Thus, a cache access in a cache subsystem of the present disclosure may be guaranteed to be no more than a specified maximum value. Furthermore, any sequence of access commands can be sent to the cache. The cache subsystem according to the present disclosure can fully utilize available bandwidth, receiving one cache access request and providing data from one request per clock cycle, while still providing all requests within the maximum bounded latency.

The present disclosure begins with a discussion of various embodiments of a cache subsystem that uses pipeline circuitry to vary the access latency. A system implementing a cache subsystem of the present disclosure is also discussed. Thereafter, various methods for operating such a cache subsystem are described. The specification concludes with the discussion of an example system which may implement processing circuitry that includes an embodiment of the cache subsystem of the present disclosure.

Cache Subsystem with Variable Latency Cache:

FIG. 1 is a block diagram of one embodiment of a cache subsystem having a pipelined structure to support variable latency access. In the embodiment shown, cache subsystem 100 includes a data array 101 that is divided into a number of groups of storage locations. In this particular example, each of the groups of data array 101 include a number of indexes as the storage locations. Each of the groups is associated with a latency control circuit. More particularly, Group 1 is associated with latency control circuit 110, Group 2 is associated with latency control circuit 115, and Group 3 is associated with latency control circuit 120. A pipeline control circuit 105 is also part of cache subsystem 100, and is responsible for conveying commands to access data from particular groups. Additionally, pipeline control circuit 105 is configured to output data from cache subsystem 100 in response to various requests input thereto.

It is noted that the number of groups of data arrays shown here, as well as the number of latency control circuits, are but one example of an arrangement of a cache per the present disclosure. Accordingly, neither the number of groups shown nor the number of latency control circuits is intended to be limiting. Similarly, the arrangement of the individual groups is not intended to be limiting.

For the purposes of this disclosure, a first group of storage locations is referred to as being "upstream" when it is further from the pipeline control circuit 105 than a second group. Similarly, a first group may be considered "downstream" with respect to a second group when it is closer to the pipeline control circuit.

Pipeline control circuit 105 in the embodiment shown is configured to initiate accesses of data from the various groups of data array 101, as well as outputting data that is retrieved in response to a request. In the embodiment shown, for a given cycle (e.g., clock cycle), pipeline control circuit 105 may initiate one access to data array 101. Furthermore, pipeline control circuit 105 may output data from one request per a given cycle. Accordingly, in the embodiment shown, pipeline control circuit 105 supports a 1:1 ratio per cycle of requests that are input to requests for which data is output. As will be discussed in further detail below, cache subsystem 100 may receive requests in any order and provide data in response to these requests at a latency that is no greater than a bounded maximum value.

Each of the groups have different minimum access latencies with respect to one another, with the most upstream group (Group 3 in this particular embodiment) having a minimum access latency that corresponds to a bounded maximum latency for all requests. The different minimum access latencies are a consequence of the size and geometry of data array 101. In particular, those groups that are more upstream from pipeline control circuit 105 have a greater minimum access latency with respect to other groups. The minimum possible access latency for an access to cache subsystem 100 is defined by the minimum access latency from Group 1, which is the closest (most downstream) group to pipeline control circuit 105. Thus, if no other requests are pending, an access from Group 1 may be carried out at the minimum latency, which is less than the minimum latency for accesses from Groups 2 or 3. However, if requests are pending from groups further upstream from Group 1, the latency of an access thereto can be greater than the minimum latency.

Generally speaking, the latency for carrying out a given request for Groups 1 and 2 may vary between that group's minimum access latency and the bounded maximum latency. The latency for carrying out any given request depends on the amount of time required for the data to propagate through the pipeline comprising the latency control circuits 110, 115, and 120, with this propagation time being greater for those groups that are further upstream. The latency may also be dependent on what other requests are pending at any given time such that the latency control circuits 110, 115, and 120 may operate to ensure all requests are satisfied at a latency no greater than the bounded maximum latency.

Ensuring that all requests are carried out within the bounded maximum latency is the function provided by latency control circuits 110, 115, and 120. For latency control circuit 120, any data corresponding to a request received by Group 3 is forwarded on the next cycle. For the subset of latency control circuits 110 and 115, requests received by their respective groups may be carried out at a variable latency. For example, if a request is pending at Group 3 and the next request is received at Group 2, latency control circuit 115 may first forward data for the request from Group 3 while temporarily storing the data for the request from Group 2. The data from the request at Group 2 may then be forwarded in a subsequent cycle. This may ensure that the latency for the access to Group 3 is no greater than the bounded maximum latency, while still meeting latency requirements for the request to Group 2. However, if a request is received at Group 2, and no previous requests are pending from Groups 2 or 3, the request to Group 2 may be carried out, with data being forwarded downstream through the pipeline, and more particularly through latency control circuit 115 followed by latency control circuit 110.

In another example, if a request is received by Group 1, but data from requests to Groups 2 and 3 are pending, the data from the request at Group 1 is temporarily stored by latency control circuit 110, which may also store received data corresponding to the request from Group 2. In this instance, the data from the request to Group 3 is forwarded first, followed by (in the next cycle) data from the request to Group 2, and finally (in the cycle after that) the data from the request to Group 1.

Figure 2:
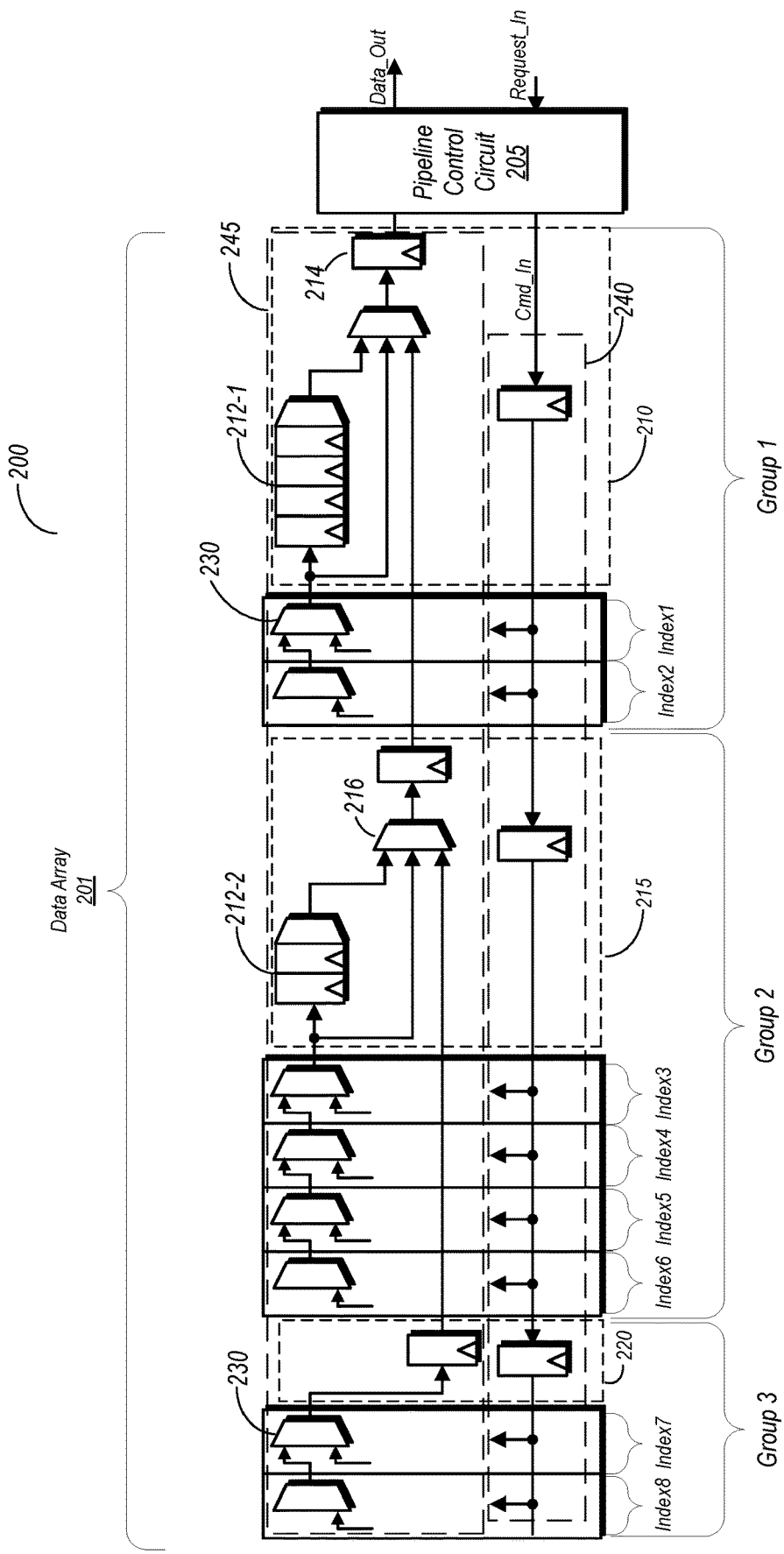
FIG. 2 is a block diagram of another embodiment of a cache subsystem.

FIG. 2 is a block diagram of another embodiment of a cache subsystem having a variable access latency. In the embodiment shown, cache subsystem 200 includes a data array 201 that is subdivided into three groups of storage locations, where each of the groups includes multiple indexes. Group 1 includes Index 1 and Index 2, Group 2 includes Index 3-6, and Group 3 includes Index 7 and Index 8. Data array 201 also includes latency control circuit 210 (associated with Group 1), latency control circuit 215 (associated with Group 2) and latency control circuit 220 (associated with Group 3). Pipeline control circuit 205 is coupled to the pipeline structure of cache subsystem 200 at latency control circuit 210. Pipeline control circuit 205 in the embodiment shown is configured to receive cache access requests from external requestors (e.g., processor cores) and to input these requests into the cache subsystem to access the requested data. Although not explicitly shown here, pipeline control circuit 205 may be coupled to various elements in the latency control circuits 210, 215, and 220 and may thus generate control signals to control the operation of these elements.

Each of the latency control circuits in the embodiment shown includes various instances of storage circuits 214. These storage circuits 214 may be clocked storage circuits that are implemented using flip-flops or other suitable clocked logic circuits. On the request input side, storage circuits 214 may provide temporary storage for commands (Cmd_In) as well as any necessary addressing information for the requested data. The commands may be conveyed through the storage circuits 214 of input pipeline 240 to their target group/index.

Latency control circuits 210, 215, and 220 include various elements that form an output pipeline 245. Each of the latency control circuits 210, 215, and 220 include instances of storage circuits 214 that provide temporary storage of requested data as it propagates through output pipeline 245. A subset of the latency control circuits, namely latency control circuits 210 and 215, also include a selection circuit 216 and a skid buffer 212 (212-1 in latency control circuit 210, 212-2 in latency control circuit 215). Each of the selection circuits 216 is used to select data to be forwarded to a corresponding storage circuit 214 and downstream through output pipeline 245. Control signals for the various selection circuits 216 may be generated within and provided from pipeline control circuit 205 in order that all requests are provided at a latency no greater than the bounded maximum. A given selection circuit 216 may select, for forwarding, data from either an upstream group, from a corresponding skid buffer 212, or directly from an index in its associated group. Each of the indexes also includes a corresponding selection circuit 230 that may, in one embodiment, select data corresponding to an oldest request when two or more requests are pending in the same group. When only a single request is pending in the current group, a corresponding selection circuit 230 may select that request to be forwarded, either into a corresponding skid buffer 212 or to a corresponding storage circuit 214, via the selection circuit 216 of that particular latency control circuit.

The skid buffers 212-1 and 212-2 in the embodiment shown may be implemented with instances of storage circuitry that are similar to the clocked storage circuits 214. These skid buffers 212 may receive data corresponding to requests to their associated group, and provide temporary storage to this data to allow requested data from groups further upstream to propagate through output pipeline 245 such that it is provided at a latency no greater than the bounded maximum. Furthermore, skid buffers 212-1 and 212-2 have a different number of entries (storage locations) with respect to one another to allow for the latency variability to accommodate multiple pending requests while meeting the latency requirements for the given implementation. In this embodiment, skid buffer 212-1 has a greater amount of storage than skid buffer 212-2, which allows for data from requests to Group 0 to be provided at a latency that varies anywhere from the minimum possible request latency (e.g., one cycle after receiving the request) to the bounded maximum latency (e.g., four cycles after receiving the request). Skid buffer 212-2 has less storage than skid buffer 212-1, and allows for a latency variability from the minimum latency for Group 2 (e.g., two cycles after receiving the request) up to the bounded maximum latency.

Pipeline control circuit 205 in the embodiment shown may generate signals to control the operation of both input pipeline 240 and output pipeline 245. These signals may include clock signals that are provided to the various clocked storage circuits 214 in input pipeline 240 as well as those in output pipeline 245 (and including those in the skid buffers 212). Pipeline control circuit 205 in the embodiment shown may also include circuitry to generate control signals to the various selection circuits 216 and 230. This circuitry may include various types of sequential logic/state machines that generate signals such that data from transactions are forwarded in such a manner that data is provided within the bounded maximum latency. In this particular embodiment, the control signal generation may be performed such that the most upstream group (Group 3) provides data from requests for access thereto in four cycles (e.g., clock cycles). Access requests to Group 2 may have a variable latency between two and four cycles, while access requests to Group 1 may have a variable latency between one and four cycles.

Figure 3:
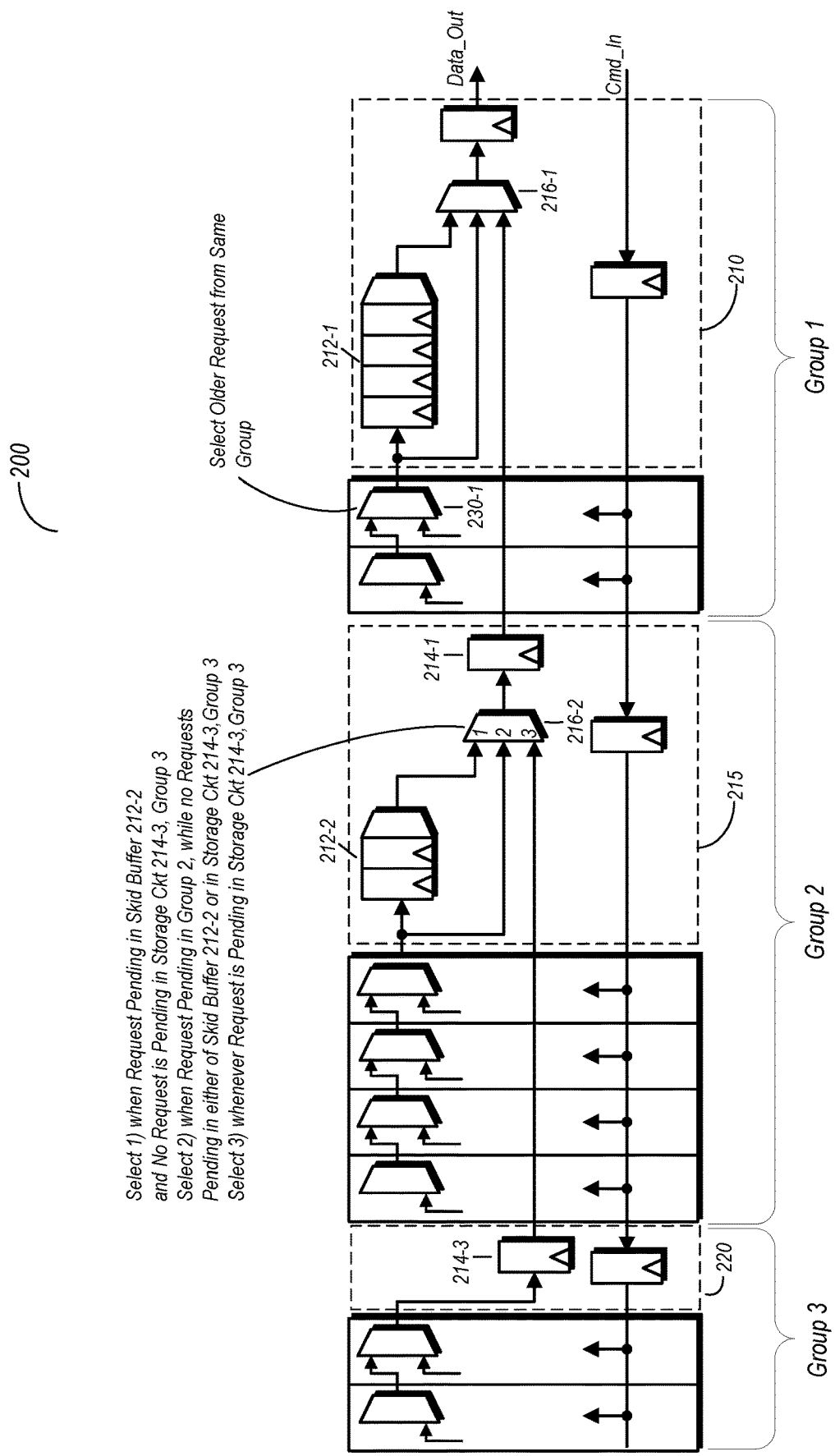
FIG. 3 is a block diagram illustrating certain operational details of an embodiment of a cache subsystem.

FIG. 3 is a block diagram of an embodiment of a cache subsystem illustrating certain operational details. More particularly, FIG. 3 is provided here to illustrate the operation of selection circuits 216 and 230 in the output pipeline. As shown in FIG. 3, a given selection circuit 216 includes three inputs, labeled 1, 2 and 3. Input 1 is coupled to the output of skid buffer 212-2, input 2 is coupled directly to the indexes of Group 2, and input 3 is coupled directly to storage circuit 214-3 in Group 3 of latency control circuit 220.

During operations, control signals are provided to selection circuit 216-2 in order to cause it to select one of the inputs. Input 1 may be selected when data from a pending request is stored in skid buffer 212-2 while no data from a pending request is stored in the upstream storage circuit 214-3 of Group 3. Input 2 may be selected when there is no data from pending requests in either skid buffer 212-2 or in upstream storage circuit 214-3. Input 3 may be selected whenever data is present in storage circuit 214-3, irrespective of whether data for pending requests is stored in either of skid buffer 212-2 or in one of the indexes of Group 2.

In this manner, the data for the most upstream request is given priority in order to allow its data to be output without exceeding the bounded maximum latency specified for cache subsystem 200. When no data for an upstream request is pending, the given latency control circuit may prioritize selection of data from skid buffer 212-2 over that in one of the indexes of Group 2, as the request whose data is stored in the skid buffer is older. Data for a request is taken directly from one of the indexes in a group when there are no requests pending upstream in the pipeline or in the skid buffer 212-2.

It is noted that selection circuit 216-1 in Group 1 may function similarly to that in Group 2, prioritizing selections from in an order from 1) storage circuit 214-2, 2) skid buffer 212-1, and finally 3) from indexes in Group 1.

With regard to the selection circuits 230, such as selection circuit 230-1 as shown here, priority for two requests in the same group is given to older requests over newer requests.

The operation described above allows for requests to be received in any order by cache subsystem 200, without regard to which group the corresponding data is stored. Furthermore, latency requirements can be met while allowing one request to be input per cycle while also outputting data from one request per cycle. As discussed above, the latency for requests in all but the most upstream group may vary depending on what other requests are pending. However, the operation described herein allows all requests to be satisfied with a latency that is no more than the bounded maximum latency specified for the particular implementation of the cache subsystem.

Figure 4:
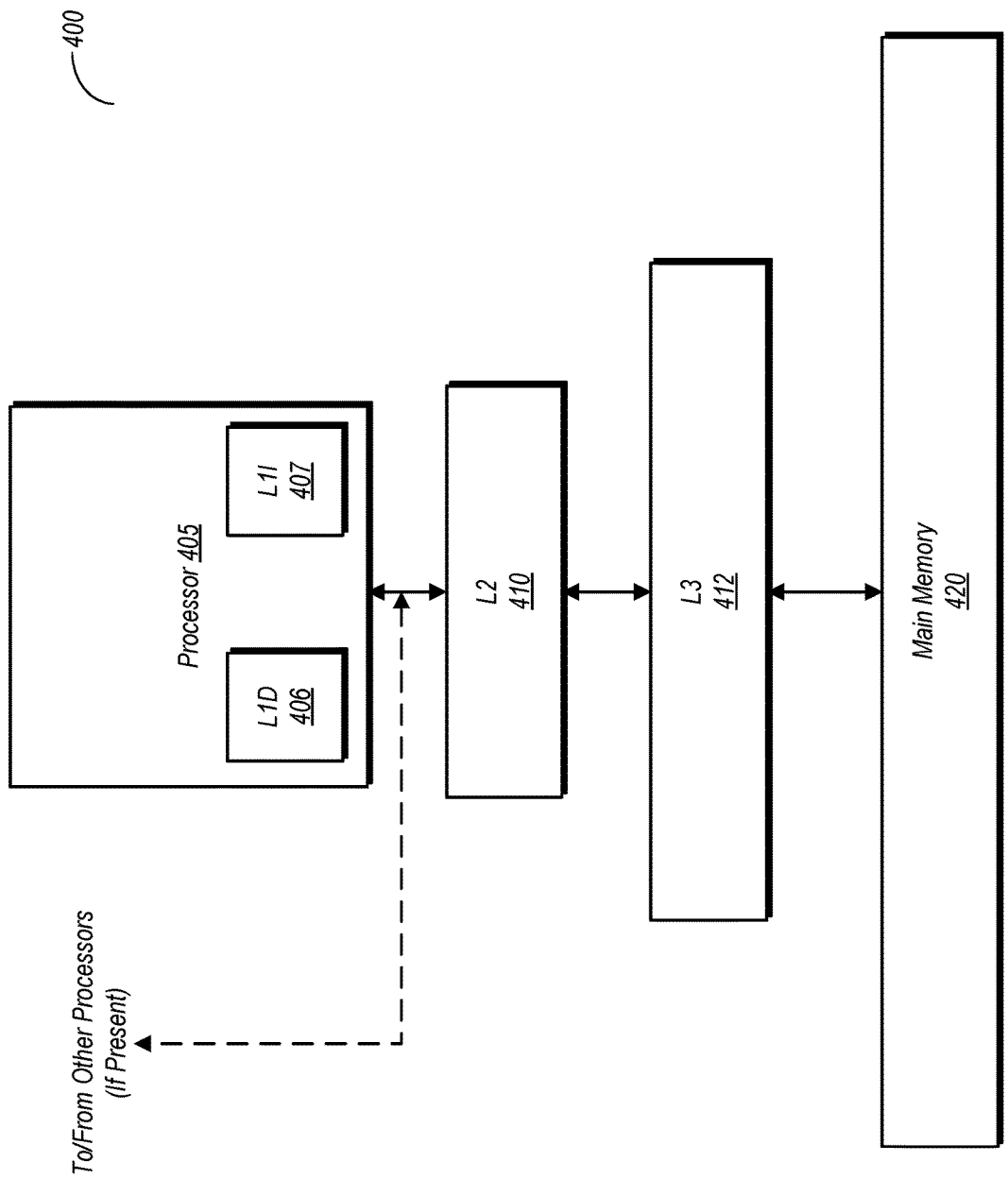
FIG. 4 is a block diagram of a system including a cache hierarchy.

System with Cache Hierarchy:

FIG. 4 is a block diagram of a system including a memory hierarchy. In the embodiment shown, system 400 includes at least one processor 405. Additional processors may be included in some embodiments. Although not explicitly shown here, the various caches shown in FIG. 4 may include a corresponding cache controller that comprise circuitry for carrying out various functions of the corresponding cache. Such functions may include writing information to the cache, reading information from the cache, marking cache lines dirty and/or invalid, evicting cache lines, and so on.

Processor 405 includes an L1 data cache 405 which may be used to store frequently and/or recently used data. Processor 405 also includes an L1 instruction cache 407, which may be used to store frequently and/or recently used instructions.

System 400 also includes an L2 cache 410, which may store both data an instructions. In embodiments with multiple processors, L2 cache 410 may be shared. L2 cache 410 in the embodiment shown has a larger storage capacity than either of L1 data cache 406 and L1 instruction cache 407. Another cache, L3 cache 410, includes even more storage capacity than L2 cache 412, and may also be used to store both data an instructions. Additionally, L3 cache 412 may be shared by multiple processors in embodiments that include them. A main memory 420 is also included in system 400 (and may be associated with a memory controller that is not shown here). In this particular embodiment, L3 cache may also be designated as a last level cache (LLC).

At least one of the cache memories shown in FIG. 4 may be a variable latency cache in accordance with the present disclosure. While the disclosure is not limited to a particular size of cache, the variable latency cache discussed above may be particularly suitable in larger cache implementations, such as with L3 cache 412. A larger cache such as L3 cache 412 may have a large footprint on an integrated circuit, and space limitations may thus dictate its layout geometry. This, in turn, may affect the latency of accesses to some storage locations in the data array. Accordingly, L3 cache 412 as shown here may be implemented by dividing the data array into groups (e.g., index groups) and placing latency control circuits between the groups, in accordance with the discussion above. A pipeline control circuit may also be included to provide control functions for the operation of the latency control circuits as well as input and output functions. Thus, accesses to L3 cache 412 may be carried out with a latency that may vary, depending on the location of the requested data, with the latency bounded to a specified maximum value.

Figure 5:
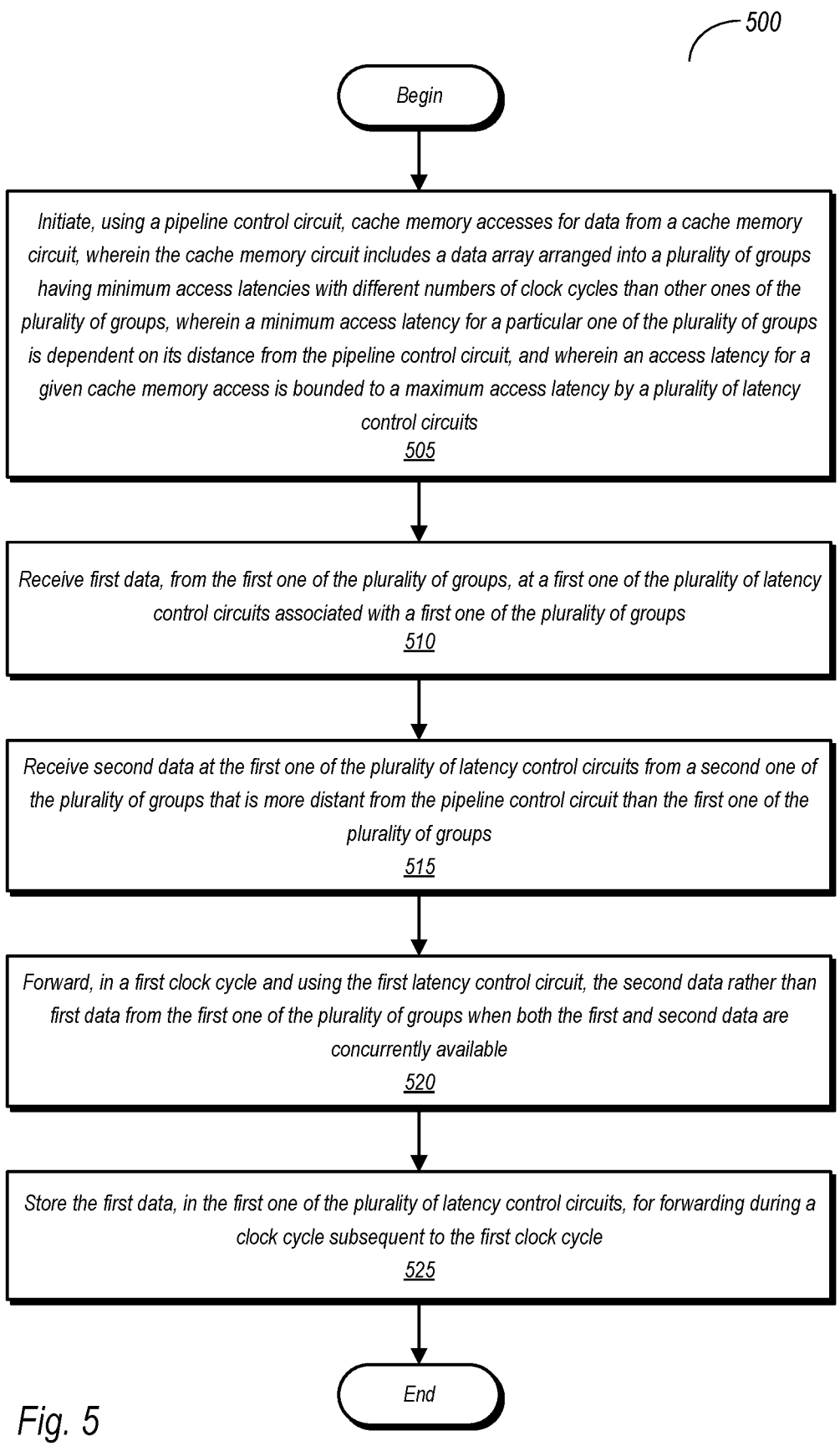
FIG. 5 is a flow diagram of one embodiment of a method for operating a cache subsystem.

Methods of Operation:

FIG. 5 is a flow diagram of one embodiment of a method for operating a cache subsystem. Method 500 may be carried out by any embodiment of a cache subsystem as discussed above with reference to FIGS. 1-4. Embodiments of a cache subsystem capable of carrying out Method 500, but not otherwise disclosed herein, are also considered to fall within the scope of this disclosure.

Method 500 begins with initiating, using a pipeline control circuit, cache memory accesses for data from a cache memory circuit, wherein the cache memory circuit includes a data array arranged into a plurality of groups having minimum access latencies with different numbers of clock cycles than other ones of the plurality of groups, wherein a minimum access latency for a particular one of the plurality of groups is dependent on its distance from the pipeline control circuit, and wherein an access latency for a given cache memory access is bounded to a maximum access latency by a plurality of latency control circuits (block 505). Method 500 further includes receiving first data, from the first one of the plurality of groups, at a first one of the plurality of latency control circuits associated with a first one of the plurality of groups (block 510) and receiving second data at the first one of the plurality of latency control circuits from a second one of the plurality of groups that is more distant from the pipeline control circuit than the first one of the plurality of groups (block 515). The method further includes forwarding, in a first clock cycle and using the first latency control circuit, the second data rather than first data from the first one of the plurality of groups when both the first and second data are concurrently available (block 520), and storing the first data, in the first one of the plurality of latency control circuits, for forwarding during a clock cycle subsequent to the first clock cycle (block 525).

In various embodiments, the maximum access latency corresponds to the minimum access latency for a cache memory access to a one of the plurality of groups that is furthest from the pipeline control circuit. The ones of the plurality of latency control circuits are associated with corresponding ones of the plurality of groups. A subset of the latency control circuits include a corresponding skid buffer circuit, and the method thus includes storing the first data in a skid buffer circuit of the first one of the plurality of latency control circuits. Ones of the subset of the latency control circuits include a selection circuit. Accordingly, the method further comprises the selection circuit prioritizing selecting data from a group furthest from the pipeline control circuit over data from groups closer to the pipeline control circuit. Embodiments of the method may also further include comprising the selection circuit prioritizing selecting data from a skid buffer in a corresponding latency control circuit over data directly from a corresponding one of the plurality of groups.

Figure 6:
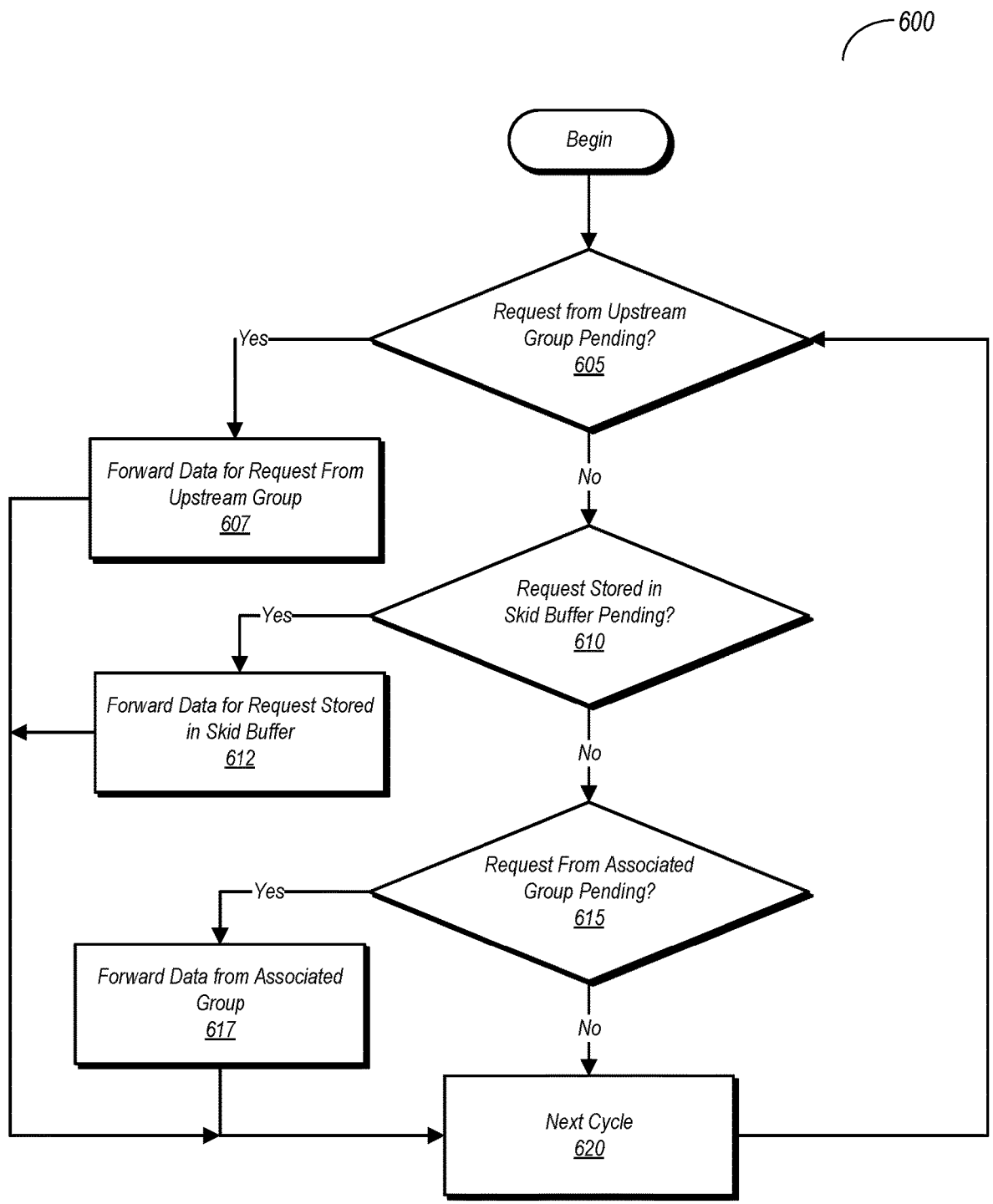
FIG. 6 is a flow diagram of a method for operating a latency control circuit in a cache subsystem.

FIG. 6 is a flow diagram of another embodiment of a method for operating a cache subsystem. Method 600 is more particularly direct to operating one of a subset of latency control circuits such as those shown in FIGS. 2 and 3. Method 600 may be carried out in any of the embodiments of a cache subsystem as disclosed herein. Embodiments of a cache subsystem that include circuitry capable of carrying out Method 600 but not explicitly discussed herein are also considered to fall within the scope of this disclosure.

In a given cycle, a selection circuit in a particular latency control circuit may select data corresponding to a request to be forwarded through the pipeline to be provided to a requestor. The latency control circuit whose operation is described by FIG. 6 is one of a subset of latency control circuits associated with a particular storage group (e.g., a group of indexes) where there is at least one additional group upstream, or further from the pipeline control circuit than the associated group. If a request is pending from an upstream group (block 605, yes), data from that request is selected to be forwarded downstream (block 607). If there is no request pending from an upstream group (block 605, no), but a request is pending in the skid buffer of the latency control circuit (block 610, yes), then data from the skid buffer is forwarded downstream (block 612). If there is no data stored for a pending request in the skid buffer of the present latency control circuit (block 610, no), but data from the associated group is available for a pending request (block 615, yes), then that data is forwarded downstream (block 617). If no data is present in the associated group (block 615, no), no data is forwarded the current cycle.

After the forwarding of selected data (block 607, 612, or 617) for the current cycle, or if no data was available for forwarding, Method 600 proceeds to the next cycle (block 620) and returns to block 605. The operation described herein prioritizes forwarding data from upstream groups before data stored in a skid buffer or in the associated group is forwarded in order that latency for a particular request is bounded to a specified maximum value, and prioritizing data stored in a skid buffer (which is from an older request) over data directly from the associated group. In this manner, requests for data from the various groups can be satisfied with a maximum latency that is bounded. When no upstream or older requests are pending, data from a request to an associated group may be satisfied with a latency that is less than the maximum latency.

Figure 7:
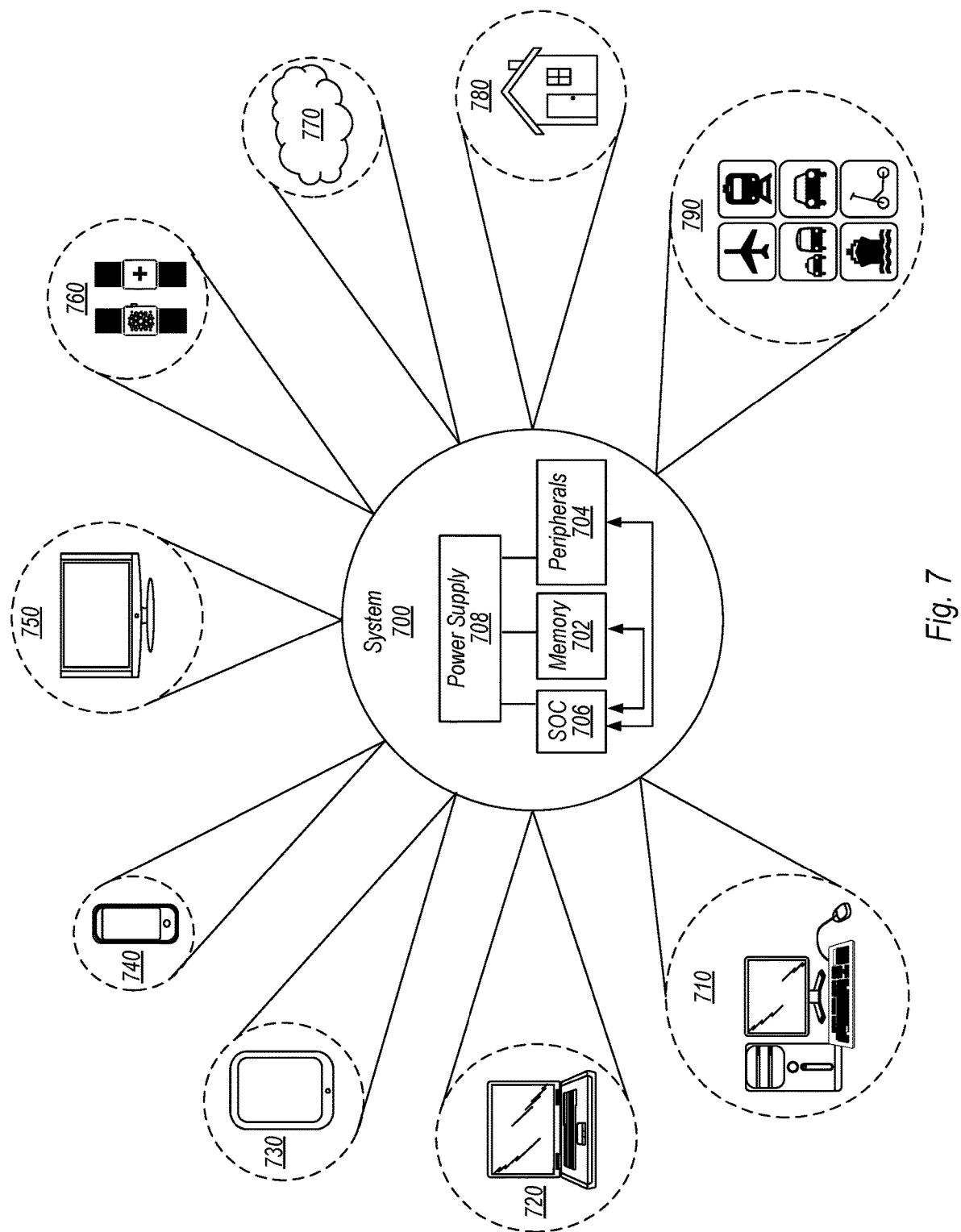
FIG. 7 is a block diagram of one embodiment of an example system.

Example System:

Turning next to FIG. 7, a block diagram of one embodiment of a system 700 is shown that may incorporate and/or otherwise utilize the methods and mechanisms described herein. In the illustrated embodiment, the system 700 includes at least one instance of a system on chip (SoC) 706 which may include multiple types of processing units, such as a central processing unit (CPU), a graphics processing unit (GPU), or otherwise, a communication fabric, and interfaces to memories and input/output devices. In some embodiments, one or more processors in SoC 706 includes multiple execution lanes and an instruction issue queue. In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer, or other device). In some embodiments, more than one instance of SoC 706 is included (and more than one external memory 702 is included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 706 in the embodiment shown may include various levels of cache memory, some of which may be shared among various components, while others may be dedicated caches. Such cache memories may be implemented as a part of corresponding cache subsystems. At least some of the cache subsystems on SoC 706 may operate in accordance with the various hardware and method embodiments discussed above in reference to FIGS. 1-6. Accordingly, at least some the various cache subsystems on SoC 706 may be arranged as variable latency caches, with the latency for providing data from a particular access request being at least partially dependent on the physical location in which the requested data is stored relative to a pipeline control circuit. Such a cache (or caches) may be arranged in groups of, e.g., indexes, where groups closer to a pipeline control circuit may be accessed with a latency that varies from some minimum value up to a maximum value. For example, a last level cache in one embodiment may have a number of different groups, with the bounded maximum latency being that which corresponds to the access latency for a group that is furthest from the pipeline control circuit.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch 760 may include a variety of general-purpose computing related functions. For example, smartwatch 760 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 7 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 7 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components. etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
  a pipeline control circuit configured to initiate cache memory accesses for data;
  a cache memory circuit having a data array arranged into a plurality of groups, wherein different ones of the plurality of groups have different minimum access latencies due to different distances from the pipeline control circuit; and
  a plurality of latency control circuits configured to ensure a latency is bounded to a maximum value for a given access to the data array, wherein a given latency control circuit is associated with a corresponding group of the plurality of groups, and wherein a first latency control circuit is associated with a first of the plurality of groups and is configured to:
    receive first data from first group;
    receive second data from a second group that is more distant from the pipeline control circuit than the first group;
    forward the second data rather than first data from the first group when both the first and second data are concurrently available; and
    store the first data for forwarding at a later time.

2. The apparatus of claim 1, wherein ones of the plurality of latency control circuits include a storage circuit configured to store data received from a correspondingly coupled one of the plurality of groups.

3. The apparatus of claim 2, wherein ones of a subset of the plurality of latency control circuits include a skid buffer circuit configured to store data from ones of the plurality of groups for at least two clock cycles.

4. The apparatus of claim 3, wherein a skid buffer circuit associated with one of the plurality of groups has a different number of entries than a skid buffer circuit associated with a different one of the plurality of groups.

5. The apparatus of claim 3, wherein ones of the subset of the plurality of latency control circuits include a selection circuit, wherein the selection circuit of a given one of the subset of latency control circuits includes:
  a first input coupled to receive data from a delay buffer of a group that is more distant from the pipeline control circuit than a group associated with the given one of the subset of latency control circuits;
  a second input coupled to receive data from a storage location within its associated one of the plurality of groups; and
  a third input coupled to receive data from the skid buffer from its associated one of the plurality of groups.

6. The apparatus of claim 5, wherein the selection circuit of the given one of the plurality of latency control circuits is configured to select the first, second, or third input depending upon which of the first, second and third inputs is receiving a pending request from a location farthest from the pipeline control circuit.

7. The apparatus of claim 1, wherein the pipeline control circuit is configured to cause an access from a one of the plurality of groups closest to the pipeline control circuit to be carried out with a latency varying between a minimum value and the bounded maximum value.

8. The apparatus of claim 7, wherein the pipeline control circuit is configured to cause the access from the one of the plurality of groups closest to the pipeline control circuit to be carried out with a latency that is greater than the minimum value if at least one other request is pending from another one of the plurality of groups that is farther from the pipeline control circuit.

9. The apparatus of claim 1, wherein the pipeline control circuit is configured to cause outputting of data at the bounded maximum latency from a one of the plurality of groups that is farthest from the pipeline control circuit.

10. The apparatus of claim 1, wherein the pipeline control circuit is configured to receive one access request per clock cycle and further configured to provide output data corresponding to one access request per clock cycle.

11. A method comprising:
  initiating, using a pipeline control circuit, cache memory accesses for data from a cache memory circuit, wherein the cache memory circuit includes a data array arranged into a plurality of groups having minimum access latencies with different numbers of clock cycles than other ones of the plurality of groups, wherein a minimum access latency for a particular one of the plurality of groups is dependent on its distance from the pipeline control circuit, and wherein an access latency for a given cache memory access is bounded to a maximum access latency by a plurality of latency control circuits;

receiving first data, from a first one of the plurality of groups, at a first one of the plurality of latency control circuits associated with a first one of the plurality of groups;

receiving second data at the first one of the plurality of latency control circuits from a second one of the plurality of groups that is more distant from the pipeline control circuit than the first one of the plurality of groups;

forwarding, in a first clock cycle and using the first one of the plurality of latency control circuits, the second data rather than first data from the first one of the plurality of groups when both the first and second data are concurrently available; and storing the first data, in the first one of the plurality of latency control circuits, for forwarding during a clock cycle subsequent to the first clock cycle.

12. The method of claim 11, wherein the maximum access latency corresponds to the minimum access latency for a cache memory access to a one of the plurality of groups that is furthest from the pipeline control circuit.

13. The method of claim 11, wherein ones of the plurality of latency control circuits are associated with corresponding ones of the plurality of groups, and wherein a subset of the latency control circuits include a corresponding skid buffer circuit, and wherein the method further comprises storing the first data in a skid buffer circuit of the first one of the plurality of latency control circuits.

14. The method of claim 13, wherein ones of the subset of the latency control circuits include a selection circuit, and wherein the method further comprises the selection circuit prioritizing selecting data from a group furthest from the pipeline control circuit over data from groups closer to the pipeline control circuit.

15. The method of claim 14, further comprising the selection circuit prioritizing selecting data from a skid buffer in a corresponding latency control circuit over data directly from a corresponding one of the plurality of groups.

16. The method of claim 11, further comprising:
providing data from a one of the plurality of groups furthest from the pipeline control circuit at the maximum access latency;
providing data from a one of the plurality of groups closest to the pipeline control circuit at a first latency varying between the minimum access latency and the maximum access latency; and
providing data from a one of the plurality of groups that is neither closet to nor furthest from the pipeline control circuit at a second latency varying between the maximum access latency and a value greater than the minimum access latency.

17. A system comprising:
one or more processor cores;
a cache subsystem including a pipeline control circuit and a cache memory accessible by the one or more processor cores, wherein the cache memory includes a data array arranged into a plurality of groups, wherein different ones of the plurality of groups have different minimum access latencies due to different distances from the pipeline control circuit, and wherein a maximum access latency for a given cache access is equivalent to the minimum access latency for a one of the plurality of groups that is furthest from the pipeline control circuit;
wherein the cache subsystem is configured to output data in response to a cache access requests at a latency that varies between the minimum access latency and the maximum access latency.

18. The system of claim 17, wherein the cache subsystem includes a plurality of latency control circuits, wherein ones of the plurality of latency control circuits are associated with corresponding ones of the plurality of groups, wherein ones of the plurality of latency control circuits includes a storage circuit configured to provide temporary storage of data retrieved from its corresponding one of the plurality of groups.

19. The system of claim 18, wherein a subset of the plurality of latency control circuits includes:
a buffer circuit configured to store data for two or more cache access requests; and
a selection circuit having a first input coupled to an output of the buffer circuit, a second coupled to receive data from an index in an associated one of the plurality of groups, and a third input coupled to receive data from a storage circuit in one of the plurality of groups that is further from the pipeline control circuit than the associated one of the plurality of groups;
wherein the selection circuit is configured to select, for forwarding, data received via one of the first, second, or third inputs to enforce the maximum latency for corresponding access requests.

20. The system of claim 17, wherein the pipeline control circuit is configured to receive one access request per clock cycle and further configured to provide output data corresponding to one access request per clock cycle.

* * * * *